US010055107B2

(12) United States Patent
Price et al.

(10) Patent No.: US 10,055,107 B2
(45) Date of Patent: Aug. 21, 2018

(54) PROBABILISTIC DETERMINATION OF SELECTED IMAGE PORTIONS (71) Applicant: Adobe Systems Incorporated, San Jose, CA (US)

(72) Inventors: Brian L. Price, San Jose, CA (US); Ian D. Sachs, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 240 days.

(21) Appl. No.: 14/853,069

(22) Filed: Sep. 14, 2015

(65) Prior Publication Data

US 2017/0075544 A1 Mar. 16, 2017

(51) Int. Cl.
*G06F 3/0484* (2013.01)
*G06T 7/00* (2017.01)

(52) U.S. Cl.
CPC ...... *G06F 3/04845* (2013.01); *G06F 3/04842* (2013.01); *G06T 7/0081* (2013.01); *G06T 7/0085* (2013.01); *G06T 2207/20076* (2013.01)

(58) Field of Classification Search
CPC ............. G06F 3/04845; G06F 3/04842; G06T 7/0081; G06T 7/0085; G06T 2207/20076
USPC ........................................................ 382/100
See application file for complete search history.

(56) References Cited

U.S. PATENT DOCUMENTS

2007/0188510 A1* 8/2007 Kokemohr .......... G06F 3/04845
345/581

OTHER PUBLICATIONS

"The Magic Wand Tool-Photoshop Selections." Photoshop Essentials. N.p., May 16, 2015. Web. Jul. 7, 2017.*
Subr, Kartic, et al. "Accurate binary image selection from inaccurate user input." Computer Graphics Forum. vol. 32. No. 2pt1. Blackwell Publishing Ltd, 2013.*
Boykov,"Interactive Graph Cuts for Optimal Boundary & Region Segmentation of Objects in N-D Images", Proceedings of International Conference on Computer Vision, Vancouver, Canada, vol. 1, Jul. 2001, pp. 105-112.
Subr,"Accurate Binary Image Selection from Inaccurate User Input", Computer Graphics Forum, 32(2pt1):41{50, May 2013, 11 pages.

* cited by examiner

*Primary Examiner* — Amandeep Saini
(74) *Attorney, Agent, or Firm* — Wolfe-SBMC (57) ABSTRACT

Probabilistic determination of selected image portions is described. In one or more implementations, a selection input is received for selecting a portion of an image. For pixels of the image that correspond to the selection input, probabilities are determined that the pixels are intended to be included as part of a selected portion of the image. In particular, the probability that a given pixel is intended to be included as part of the selected portion of the image is determined as a function of position relative to center pixels of the selection input as well as a difference in one or more visual characteristics with the center pixels. The determined probabilities can then be used to segment the selected portion of the image from a remainder of the image. Based on the segmentation of the selected portion from the remainder of the image, selected portion data can be generated that defines the selected portion of the image.

20 Claims, 6 Drawing Sheets

502
Generate a color model that describes visual characteristics of pixels of an image that are indicated by a selection input

504
Compare the visual characteristics of the pixels that are along a center pathway of the selection input to the visual characteristics of the other pixels indicated by the selection input

506
Determine differences between the pixels along the center pathway and the other pixels based on the comparison of the visual characteristics

508
Compute probabilities that the pixels indicated by the selection input are intended to be included as part of a selected portion of the image based on the differences

510
Segment the selected portion of the image from a remainder of the image based, in part, on the probabilities

512
Generate selected portion data indicative of the selected portion based on the segmenting

PROBABILISTIC DETERMINATION OF SELECTED IMAGE PORTIONS

BACKGROUND

Marking specific portions of an image as selected is an indispensable task in image editing. Doing so serves as a starting point for many image editing operations such as background replacement, color and tone manipulation, copying and pasting, and so on. Scribble selection techniques allow a user to make a series of sparse strokes over an image to select a portion of the image. For example, a user may make a series of strokes on a touch-enabled display of a tablet device with a finger over portions of an image displayed on the display that are to be selected. The series of strokes can be used, along with information about the image, to determine a selected portion of the image.

In some cases, the strokes made by a user to select a portion of an image may not be completely accurate. A user's stroke may, for instance, cross over from a portion of the image the user intends to select to a background portion which the user does not intend to select. Even though a user may not intend an entirety of the stroked-over portion of the image to be selected, conventional techniques consider a user's strokes as being completely accurate when determining a selected portion from a scribbled input. This can pose a significant difficulty with making selections on smaller screens, such as those of touch-enabled tablet and mobile devices, however. When making scribbled selections on such screens it can be difficult for users to keep their strokes within the bounds of the objects they intend to select. This problem can be further exacerbated when a user's finger that is being used to make such a selection blocks the user from being able to see a portion of the object they are trying to select, making selection even more difficult. Consequently, conventional techniques for determining a selected portion of an image from a scribbled selection can fail to select portions of an image according to a user's intentions.

SUMMARY

Probabilistic determination of selected image portions is described. In one or more implementations, a selection input is received for selecting a portion of an image. For pixels of the image that correspond to the selection input, probabilities are determined that the pixels are intended to be included as part of a selected portion of the image. In particular, the probability that a given pixel is intended to be included as part of the selected portion of the image is determined as a function of position relative to center pixels of the selection input as well as a difference in one or more visual characteristics with the center pixels.

The determined probabilities can then be used to segment the selected portion of the image from a remainder of the image. For example, the determined probabilities can be used as input for a segmentation technique that segments the selected portion from the remainder of the image. Application of the segmentation technique to the image involves identifying the pixels of the image as part of the selected portion or as part of the remainder of the image based, in part, on the determined probabilities. Based on the segmentation of the selected portion from the remainder of the image, selected portion data can be generated that defines the selected portion of the image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

When users make scribbled selection inputs to select a portion of an image on screens of tablet and mobile devices, it can be difficult for them to keep their strokes within the bounds of the objects they intend to select. A "scribbled selection input" refers to user input that is made relative to a displayed image and for which the user makes one or more strokes (e.g., with a finger, a stylus, and so on) over portions of an image that, generally, the user intends to have included as part of a selected portion of the image. When making a scribbled selection input, however, a user's strokes may cross over from the portion of the image the user intends to select to a background (or other) portion of the image the user does not intend to select. In other words, the strokes made by a user to select a portion of an image may not be completely accurate. Even though the user may not intend an entirety of the stroked-over portion of the image to be selected, conventional techniques for defining a selected portion of an image from scribbled selection input consider the strokes to be completely accurate. Accordingly, conventional techniques can fail to select portions of an image according to a user's intentions.

Probabilistic determination of selected image portions is described. In one or more implementations, probabilities are determined for pixels of an image that correspond to a selection input. With regard to a scribbled selection input made by a finger, for instance, the pixels of the image that correspond to the selection input are determined by determining a center point of the strokes made for the scribbled selection input, and then using the pixels that are within a predefined radius around the center point. In other implementations, the pixels of the input that correspond to the selection input are each of the pixels over which the finger passed while making the strokes of the scribbled selection input. This includes the pixels located where edges of the user's finger touched a display device to make the selection, e.g., the pixels corresponding to the selection input extend a width of the finger. In either case, the probabilities are determined to indicate a likelihood that each of the pixels of the selection input is intended to be included as part of the selected portion of the image. In addition to strokes made as part of a selection input, a scribbled input may be made by a finger to indicate portions of the image that are not to be selected. In other words, these do-not-select strokes help define the selected portion of the image by indicating which portions of the image are not to be selected.

To determine the probability that a given pixel of the image is intended to be included as part of the selected portion of the image, a distance of the given pixel from pixels at the center of the selection input is ascertained. Additionally, a difference in one or more visual characteristics between the given pixel and the pixels at the center of the selection input is determined. As used herein, the term "visual characteristics" refers to attributes that can be used to describe the pixels of an image, such as to distinguish one pixel from another. By way of example, and not limitation, visual characteristics can include color, brightness, saturation, and so on. In one or more implementations, the difference in the one or more visual characteristics between each pixel of the selection input and the pixels at the center of the selection input corresponds to the difference in red, green, blue (RGB) color model values of those pixels. Regardless of the visual characteristics used, the probability that a given pixel is intended to be included as part of the selected portion of the image is determined as a function of its distance from the center pixels of the selection input and a difference in the one or more visual characteristics with the center pixels.

Through application of a segmentation technique, such as the graph cuts technique, the maximum a posteriori Markov Random Fields (MAP-MRF) technique, the conditional random field (CRF) formulation technique, and so on, the probabilities can be used to segment the selected portion from a remainder of the image. In particular, the probabilities are used as input to the chosen segmentation technique. Based in part on the probabilities, the chosen segmentation technique can identify pixels of the image as part of the selected portion of the image or as part of the remainder of the image. Once the selected portion of the image is segmented from the remainder of the image, selected portion data can be generated to define the selected portion. By way of example, the selected portion data may define a binary mask that is applicable to the selected portion of the image to enable image editing operations to be performed relative the selected portion, such as background replacement, color and tone manipulation, copying and pasting, and so forth.

Unlike conventional techniques, the techniques described herein do not treat selection inputs made to select a portion of an image as being completely accurate. Rather, the techniques described herein operate under an assumption that some error may be present in a user's selection input with regard to the portion of the image the user intends to select. By computing probabilities for the pixels of a selection input (e.g., probabilities that each of those pixels is intended to be included as part of the selected portion of the image), the techniques described herein determine the selected portion of the image to reflect a user's intended selection to a greater degree than conventional techniques.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
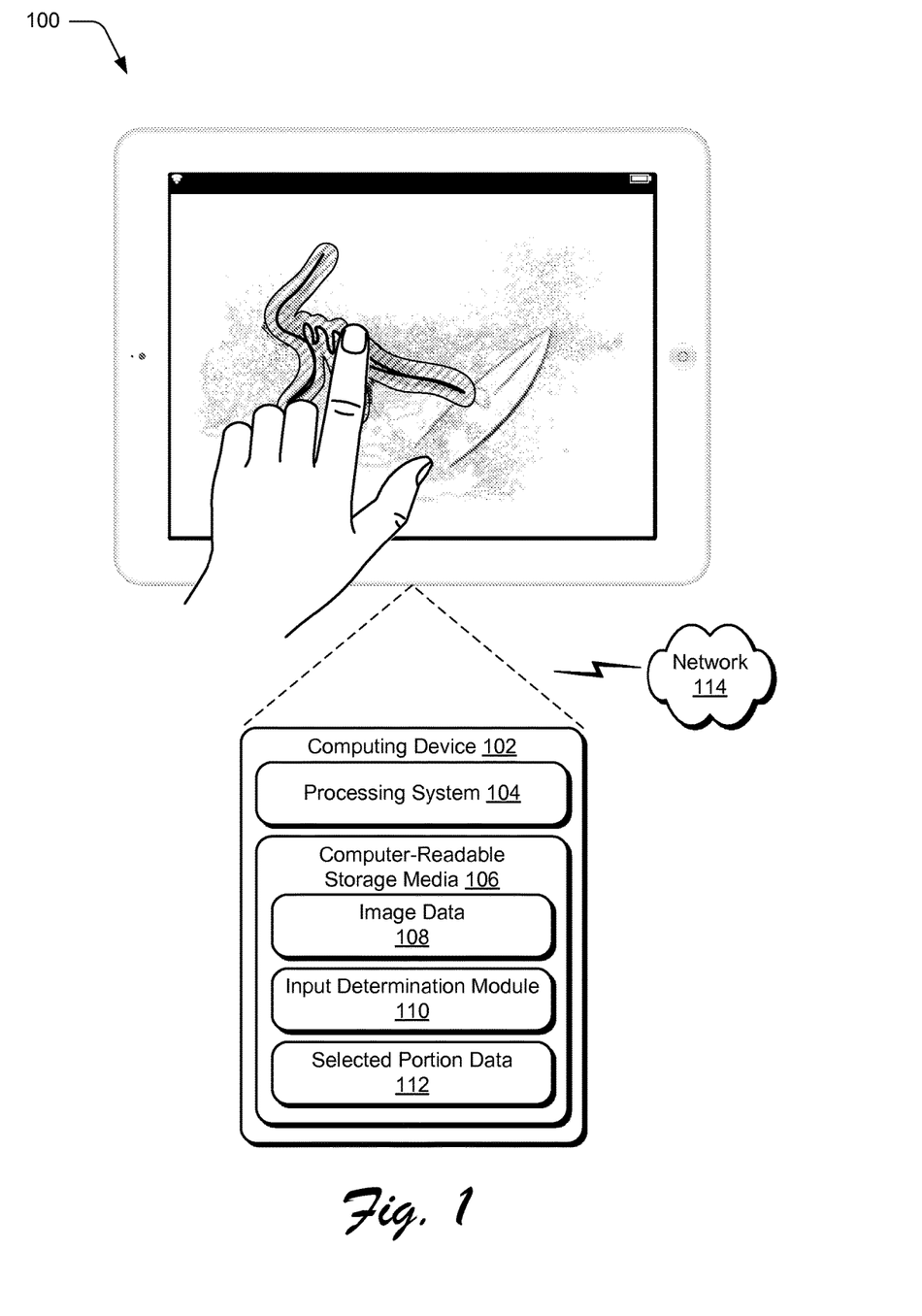
FIG. 1 is an illustration of a digital environment in an example implementation that is operable to employ techniques described herein.

FIG. 1 is an illustration of an environment 100 in an example implementation that is operable to employ techniques described herein. The illustrated environment 100 includes a computing device 102 having a processing system 104 that includes one or more processing devices (e.g., processors) and one or more computer-readable storage media 106. The illustrated environment 100 also includes image data 108 and an input determination module 110 embodied on the computer-readable storage media 106 and operable via the processing system 104 to implement corresponding functionality described herein. The computer-readable media 106 is also shown including selected portion data 112, which the input determination module 110 generates in conjunction with the techniques described herein. In at least some implementations, the computing device 102 includes functionality to access various kinds of web-based resources (content and services), interact with online providers, and so forth as described in further detail below.

The computing device 102 is configurable as any suitable type of computing device. For example, the computing device 102 may be configured as a server, a desktop computer, a laptop computer, a mobile device (e.g., assuming a handheld configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 6.

The computing device 102 is further operable to communicate over a network 114, such as the Internet, to provide a "cloud-based" computing environment, in which the computing device interacts with one or more service providers. Generally speaking, service providers are configured to make various resources available over the network 114 to clients. In some scenarios, users sign up for accounts that are employed to access corresponding resources from a provider. The provider authenticates credentials of a user (e.g., username and password) before granting access to an account and corresponding resources. Other resources are made freely available, (e.g., without authentication or account-based access). The resources can include any suitable combination of services and/or content typically made available over a network by one or more providers. Some examples of services include, but are not limited to, content creation services that offer image editing and drawing applications (e.g., Creative Cloud®, and the like), image storage and/or sharing services, social network services (e.g., Facebook®, Twitter®, Instagram®, Hyperlapse®, and the like), and so forth.

These sources serve as significant amounts of image data. Image data 108 represents such image data, which may be formatted in any of a variety of image formats, including but not limited to JPEG, TIFF, RAW, GIF, BMP, PNG, and so on. The image data made available through the services may be posted by users that have accounts with those services. For example, a user having an account with an image storage and/or sharing service uploads images, such as those edited with an image editing application at computing device 102 of the user, or those sent to the user via electronic means. A user of the image storage and/or sharing service may then share their uploaded images with others, such as by providing a link to albums of images or to a profile of the user.

The input determination module 110 represents functionality to implement techniques for probabilistic determination of selected image portions as described herein. As part of doing so, the input determination module 110 obtains data indicative of a selection input that is received for selecting a portion of an image. For example, a user may invoke a selection tool of an image editing application for selecting a portion of an image. The selection tool may enable the user to select objects in an image in a variety of different ways, including by making a scribble selection input. With regard to a scribble selection input, this data may indicate the pixels of the image over which a user made strokes (e.g., with a finger, a stylus, a mouse, and so on) for selecting a portion of the image. Given the pixels of the selection input, the input determination module 110 determines probabilities that those pixels are intended to be included as part of the selected portion of the image. The selection tool may also enable the user to select objects by indicating which portions of an image are not part of the selected object, e.g., a user may make strokes over portions of an image that are not to be selected. Since these inputs can, like selection inputs, be inaccurate, the input determination module 110 can also determine probabilities that those pixels are intended to be included as part of the selected portion of the image. Based on the input being for the purpose of indicating portions of the image that are not to be selected though, there is a strong presumption that pixels corresponding to such inputs are not to be included as part of the selected portion of the image.

To determine the probability that a given pixel is intended to be included as part of the selected portion of the image, the input determination module 110 considers the given pixel's distance from center pixels of the selection input and differences in one or more visual characteristics between the given pixel and the center pixels. Said another way, the probability that a given pixel is intended to be included as part of the selected portion of the image is a function of the given pixel's distance from the center pixels and differences in one or more characteristics with the center pixels. The input determination module 110 represents functionality to determine the distance between a given pixel and center pixels. It also represents functionality to determine differences in one or more visual characteristics between the given pixel and the center pixels.

Once the probabilities are determined, the input determination module 110 is capable of providing the probabilities for use by a segmentation technique to segment the selected portion of the image from a remainder of the image. By way of example, the input determination module 110 may provide the probabilities as input to a graph cuts technique, a maximum a posteriori Markov Random Fields (MAP-MRF) technique, a conditional random field (CRF) formulation technique, and so on. The probabilities are used by these techniques along with other values to identify the pixels of the image as being part of the selected portion or part of the remainder of the image.

Once the selected portion of the image is segmented from the remainder of the image, the selected portion data 112 is generated to define the selected portion. The selected portion data 112 may define a binary selection mask that is applicable to the image by an image editing application to enable image editing operations to be performed relative to the selected portion. The selected portion data may define the selected portion in a variety of other ways without departing from the spirit or scope of the techniques described herein, such as to define another image file that is separate from an image file that corresponds to the image from which the selected portion is selected.

In one or more implementations, the input determination module 110 is implementable as a software module, a hardware device, or using a combination of software, hardware, firmware, fixed logic circuitry, etc. Further, the input determination module 110 can be implementable as a stand-alone component of the computing device 102 as illustrated. In addition or alternatively, the input determination module 110 can be configured as a component of a web service, an application, an operating system of the computing device 102, a plug-in module, or other device application as further described in relation to FIG. 6.

Having considered an example environment, consider now a discussion of some example details of the techniques for probabilistic determination of selected image portions in accordance with one or more implementations.

Probabilistic Determination of Selected Image Portions

Figure 2:
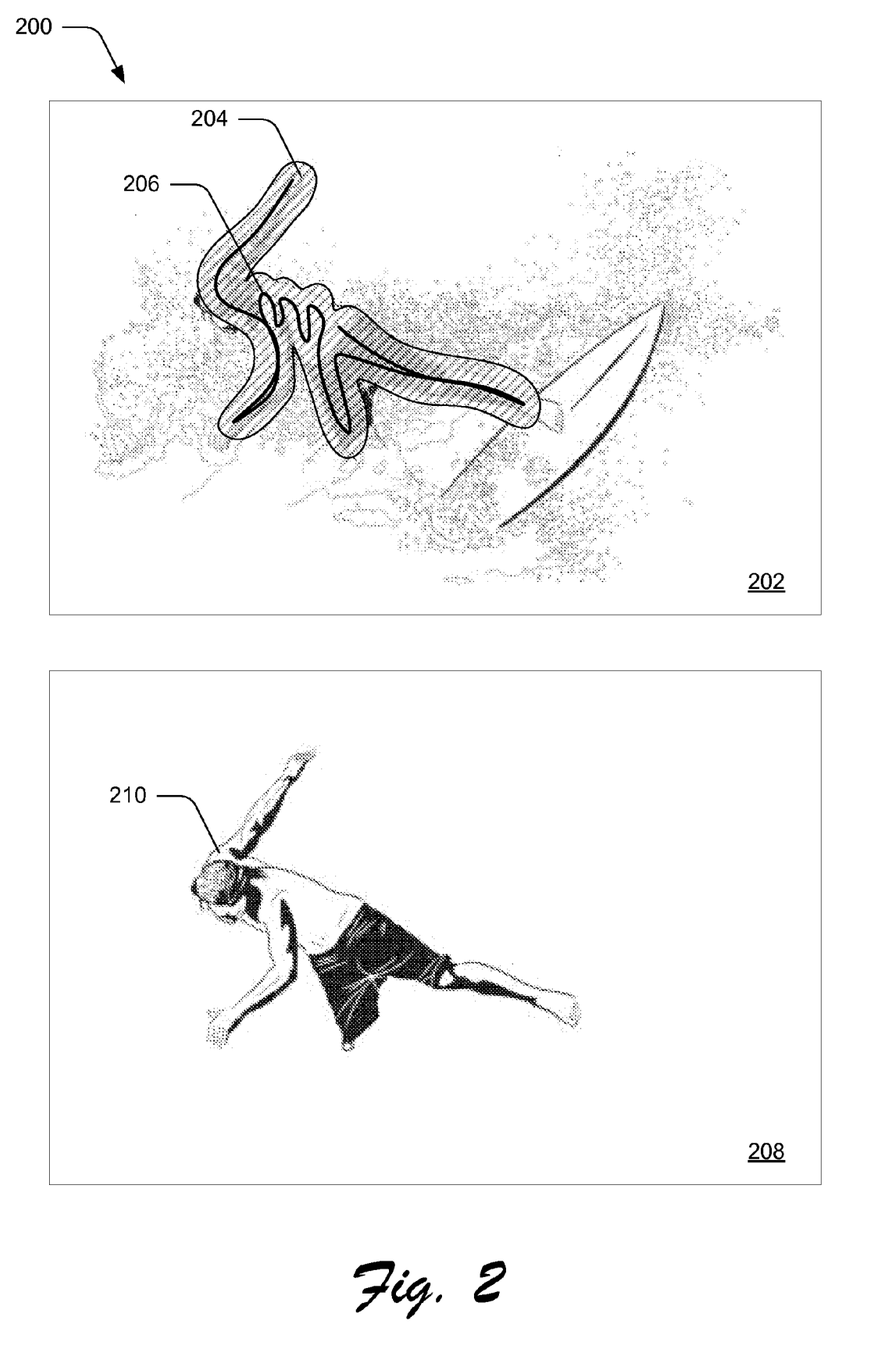
FIG. 2 illustrates an example of an image relative to which one or more strokes of a selection input are made to select a portion of the image, and an example of the portion of the image that is selected based on the selection input.

This section describes some example details of techniques for probabilistic determination of selected image portions in accordance with one or more implementations. FIG. 2 depicts an example 200 of an image relative to which one or more strokes of a selection input are made to select a portion of the image, and an example of the portion of the image that is selected based on the selection input.

The illustrated example 200 includes image 202 of a scene that includes a surfer. The image 202 can be included as part of the image data 108 maintained at the computing device 102. The illustrated example 200 also includes a representation of selection input 204, which represents input received to select a portion of the image 202. The selection input 204 is depicted with a representation of a center pathway 206, which represents a center of the selection input 204. When the selection input 204 is received as a scribbled selection made by a finger, the selection input 204 corresponds to each of the pixels of the image 202 over which the user's finger passes. The center pathway 206 represents the pixels passed over by a center of the finger. The center pathway 206 can also be determined from the pixels of the image 202 over which the user's finger passes and that correspond to the selection input 204, e.g., a midpoint between the most outward pixels corresponding to the selection input 204.

The illustrated example 200 also includes a second image 208, in which selected portion 210 of the image is depicted without other portions of the scene depicted in the image 202. Like the image 202, the second image 208 can be included as part of the image data 108 maintained by the computing device 102. The second image 208 may correspond to a different version of the image 202 in which portions other than the selected portion 210 are deleted. The second image 208 may also represent application of a binary mask to the image 202 to enable the selected portion 210 to be displayed without a remainder of the image. Alternately or in addition, the second image 208 may correspond merely to the selected portion 210, such that the dimensions of the second image 208 correspond to the bounds of the selected portion 210. In any case, the portion of the image 202 that is eventually selected (e.g., the selected portion 210) according to the selection input 204 is illustrated in the second image 208.

Figure 3:
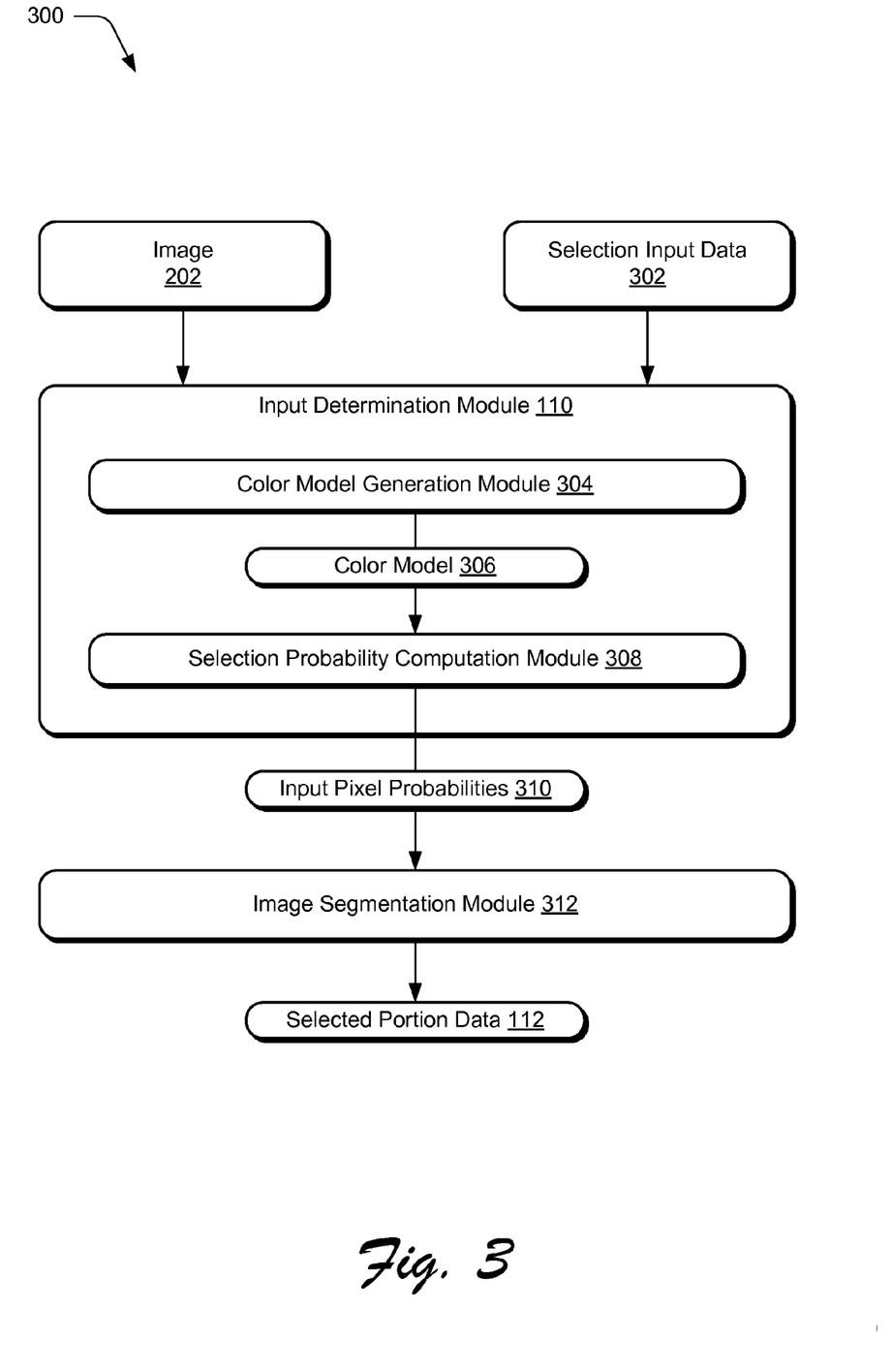
FIG. 3 depicts a system in an example implementation that is configured to determine a selected portion of an image from a selection input.

FIG. 3 depicts a system 300 for determining a selected portion of an image from a selection input, such as the selection input described with reference to FIG. 2. The example system 300 includes the input determination module 110 of FIG. 1, which takes as input the image 202 and selection input data 302. The selection input data 302 is data that is indicative of the selection input 204 received for selecting a portion of the image 202. By way of example, the selection input data 302 may indicate a position of an object used to make a selection, e.g., a finger, a stylus, a mouse, and so on, at different times, e.g., at an initial time when the selection input is first received, at a termination time when receipt of the selection input stops, and at times in between the initial and termination times. Further, the section input data 302 indicates the pixels of the image 202 over which an object used to make the selection input (e.g., a finger, a stylus, a mouse etc.) passed. In other words, the selection input data 302 indicates the pixels of the image 202 that correspond to the selection input 204. The input determination module 110 uses the image 202 and the selection input data 302 to determine probabilities that the pixels corresponding to the selection input 204 are intended to be included as part of a selected portion of the image 202.

In FIG. 3, the input determination module 110 is illustrated with color model generation module 304, color model 306, and selection probability computation module 308, which represent various aspects of computing the probabilities. The color model generation module 304 is configured to generate the color model 306, which describes color characteristics of the pixels of the image 202. Broadly speaking, a "color model" refers to an abstract mathematical model that describes the way colors can be represented as tuples of numbers, such as with three or four values of color components. Types of color models include red, green, blue (RGB) color models; cyan, magenta, yellow, and key (CMYK) color models where "key" corresponds to black; and so on. Although FIG. 3 is described with reference to generation of the color model 306, other models that describe different visual characteristics to enable pixels of an image to be compared may be generated alternatively or in addition to the color model 306 within the spirit and scope of the techniques described herein.

With regard to the color model 306 though, it can be generated to describe color characteristics of each pixel of the image 202. The color model 306 generated by the color model generation module 304 may be any type of color model that enables pixels to be compared one to another based on their colors. In one or more implementations, the color model generation module 304 generates the color model 306 as an RGB color model to describe the pixels of the image 202.

Given the color model 306, the selection probability computation module 308 computes probabilities for the pixels that correspond to the selection input 204, e.g., the pixels of the image 202 indicated by the selection input data 302. In particular, the selection probability computation module 308 computes a probability for each of the pixels corresponding to the selection input 204. For a selection input made with a finger, this includes each of the pixels over which the finger passes when making the selection input. For a selection input made by a stylus, this includes each of the pixels over which the stylus passes when making the selection input. A selection input made by a finger, a stylus, or a mouse may be made with an input brush. The input brush may have a footprint, such as a circle, that is dragged around the image 202 according to strokes made by the finger, stylus, or mouse to select portions of the image. Thus, the center pathway 206 is determinable from a center point of the input brush as it is dragged around.

In any case, the probability for a given pixel is determined as a function of the given pixel's distance from the center pixels of the selection input 204 (e.g., the pixels along the center pathway 206), and the given pixel's differences in one or more visual characteristics with the center pixels. In the example discussed with reference to FIG. 3, the differences in the one or more visual characteristics with the center pixels are the differences in values for the given pixel and the center pixels described by the color model 306.

In one or more implementations, the selection probability computation module 308 determines the distance and color differences for a given pixel with reference to a single pixel of the center pathway 206. In the following discussion, the term C represents the color model 306 of a single pixel along the center pathway 206. Further, the term I(p) represents the pixel color of a pixel at position p within a portion of the selection input 204 centered at center pixel $p_c$. By way of example, the portion of the selection input 204 that is centered at center pixel $p_c$ corresponds to the pixels within an input brush when the center pixel $p_c$ is the pixel at the center of the input brush.

The selection probability computation module 308 computes the probability W(p) that a given pixel at position p is intended to be included as part of the selected portion 210 of the image. The probability W(p) is computed in the range [0, 1] and as a function of how much I(p) differs from C. As part of doing so, the selection probability computation module 308 computes an intermediate probability W'(p). The intermediate probability W'(p) can be computed using any distance metric and weighting function that treats 0 as completely uncertain (as to whether the pixel under consideration is intended to be included as part of the selected portion 210) and approaching 1 with increasing certainty. One example of an equation that the selection probability computation module 308 is configured to use to compute the intermediate probability W'(p) is the following:

$$W'(p) = \exp\left(-\frac{|p - p_c|^2}{2\alpha^2} - \frac{|I(p) - C|^2}{2\beta^2}\right)$$

In this equation, $\alpha$ and $\beta$ are tunable parameters which provide individual control over how the probability W(p) falls off as a function of pixel position and color respectively. Given the intermediate weight, the selection probability computation module 308 is configured to compute the weight according to the following:

$$W(p) = \max[W(p), W'(p)]$$

Here, the term W(p) on the right side of the equation represents an already-computed probability for the pixel at position p, such as that which may be computed for a previously made stroke of a selection input. The selection probability computation module 308 computes the intermediate probability W'(p) and determines whether it is greater than any already-computed probabilities W(p) for each pixel of the image 202 that corresponds to the selection input 204. If there are no already-computed probabilities for the pixel at position p, the selection probability computation module 308 simply sets W(p) to W'(p). In this way, the probabilities W(p) of the pixels can be updated as more strokes of the selection input are received (or considered) to result in refined values of the probability for the pixel at position p.

In FIG. 3, input pixel probabilities 310 represent the probabilities computed by the selection probability computation module 308 in the manner described just above. The input pixel probabilities 310 may be maintained along with other data at the computing device 102.

Once computed, the input pixel probabilities 310 are usable for segmentation techniques that segment a selected portion of the image from a remainder of the image. Although the following implementation example discusses use of the input pixel probabilities 310 as being input into a graph cuts technique, the input pixel probabilities 310 are also usable in conjunction with other segmentation techniques, such as with a MAP-MRF technique, to set a unary term in a CRF formulation technique, and so on.

In one example implementation, the graph cuts technique is used to segment the selected portion 210 from a remainder of the image 202. Image segmentation module 312 represents functionality to apply an image segmentation technique to segment the selected portion 210 from the remainder of the image 202. To segment the selected portion 210 of the image 202 from the remainder of the image, the image segmentation module 312 solves the graph cuts technique by minimizing the following energy function:

$$E(x) = \sum_{x_i \in X} R(x_i) + \lambda \sum_{(x_i, x_j) \in N(X)} B(x_i, x_j)|x_i - x_j|$$

Here, the term X represents a set of pixel labels $x_i$, where the label $x_i=0$ indicates that a pixel i is part of the remainder of the image (the portion of the image 202 that is not selected) and the label $x_i=1$ indicates that the pixel i is part of the selected portion 210 of the image 202. The image segmentation module 312 sets values for $x_i$ that correspond to the input pixel probability 310 computed for the pixel i. Thus, an input pixel probability 310 that is closer to 0 indicates that the pixel i is more likely to be part of the remainder of the image than the selected portion 210, while an input pixel probability 310 that is closer to 1 indicates that the pixel i is more likely to be part of the selected portion 210 of the image 202. In the energy function indicated above, the term N(x) represents the set of pairs of labels corresponding to pixels that are neighboring in the image 202. The term $\lambda$ is a scalar that trades off a relative importance of the functions R and B.

In the indicated energy function, the function R is a region term that gives a cost for a given pixel i having the label $x_i$. In one or more formulations of the energy function, the costs set by R apply to the pixels corresponding to the selection input 204, e.g., the pixels of the image 202 under strokes made by a user to result in the selection input 204. However, the costs set by R do not apply to the pixels of the image 202 that do not correspond to the selection input 204. Further, the function R has an implicit bias for associating costs with pixels so that the pixels are part of the unselected portion of the image 202, e.g., the remainder of the image.

According to conventional techniques, if a user inputs a stroke over pixel i that indicates pixel i is to be included as part of the selected portion 210 (e.g., a stroke forming part of the selection input 204), then $R(x_i)=0$ for $x_i=1$ and $R(x_i)=\infty$ for $x_i=0$. If the user inputs a stroke over pixel i that indicates pixel i is not to be included as part of the selected portion 210 (e.g., a stroke that indicates the stroked-over portion corresponds to the remainder of the image 202), then $R(x_i)=0$ for $x_i=0$ and $R(x_i)=\infty$ for $x_i=1$. For pixels that are not covered by a user stroke (e.g., either a stroke indicating generally to select the stroked-over portion or a stroke indicating generally not to select the stroked over portion), $R(x_i)=0$. The function R can be defined using a foreground color model that is computed with each of the pixels under strokes that are made to select the stroked-over portion, and using a background color model from each of the pixels under strokes that are made to indicate that the stroked-over portion is not to be included as part of the selected portion 210.

In contrast to conventional techniques, for strokes made by a user to select a portion of the image 202 (e.g., strokes of the selection input 204), the image segmentation module 312 sets $R(x_i=0)$ to a value that is proportional to the probability W(p). For strokes made by a user that indicate a portion of the image that is not to be selected (e.g., strokes made to indicate the remainder of the image 202), the image segmentation module 312 sets $R(x_i=1)$ to a value that is proportional to the probability W(p). As a result of setting the values in this way, portions of the image 202 that have larger probabilities W(p) indicate a greater confidence that those portions are intended to be included as part of the selected portion 210. Consequently, the image segmentation module 312 associates larger penalties with marking portions of the image 202, that have the greater probabilities of being intended as part of the selected portion, as part of the remainder of the image 202. In a similar fashion, larger penalties are associated with marking portions of the image 202, that have a lesser probability of being intended as part of the selected portion, as part of the selected portion 210 of the image 202.

As mentioned just above, the image segmentation module 312 is configured to set $R(x_i=0)$ for a selection input stroke and $R(x_i=1)$ for a not-to-be-selected input stroke to values that are proportional to W(p). By way of example, the image segmentation module 312 may set these values to be proportional to W(p) by making them a function of W(p), such as $f(W(p))$. In one or more implementations, the image segmentation module 312 uses the function $f(x)=-\log(x)$. Thus, with the strokes of the selection input 204, the image segmentation module 312 sets $R(x_i=0)=f(W(p))=-\log(W(p))$. It is to be appreciated that other functions may be used without departing from the spirit or scope of the techniques described herein.

As a result of minimizing the energy function indicated above, the image segmentation module 312 determines which pixels of the image 202 are included as part of the selected portion 210 and which pixels of the image 202 are included as part of the remainder of the image. Regardless of the segmentation technique used, the image segmentation module 312 is capable of making this determination. The image segmentation module 312 is configured to generate the selected portion data 112 as a result of the segmentation. The selected portion data 112 generated by the image segmentation module 312 indicates which pixels of the image 202 are selected based on the selection input 204, and which pixels of the image correspond to a remainder of the image. As noted above, the selected portion data 112 may take a variety of forms. In any case, the selected portion data 112 implements the selection of the selected portion 210, such that image editing operations accessible through an image editing application are performable relative to the selected portion 210. Image editing operations that are performable relative to the selected portion 210 include, but are not limited to, cutting or copying the selected portion 210, changing its tone or color, applying a filter to the selected portion 210, and so on. In other words, the selected portion data 112 enables image editing operations to be performed on the selected portion 210 without performing those operations on the remainder of the image 202. In addition, the selected portion data 112 enables image editing operations to be performed on the remainder of the image 202 without performing those operations on the selected portion 210 of the image 202.

Having discussed example details of the techniques for probabilistic determination of selected image portions, consider now some example procedures to illustrate additional aspects of the techniques.

Example Procedures

This section describes example procedures for probabilistic determination of selected image portions in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the example computing device 102 of FIG. 1 that makes use of an input determination module 110 or one implemented as the example system 300 of FIG. 3 that makes use of an input determination module 110 and an image segmentation module 312.

Figure 4:
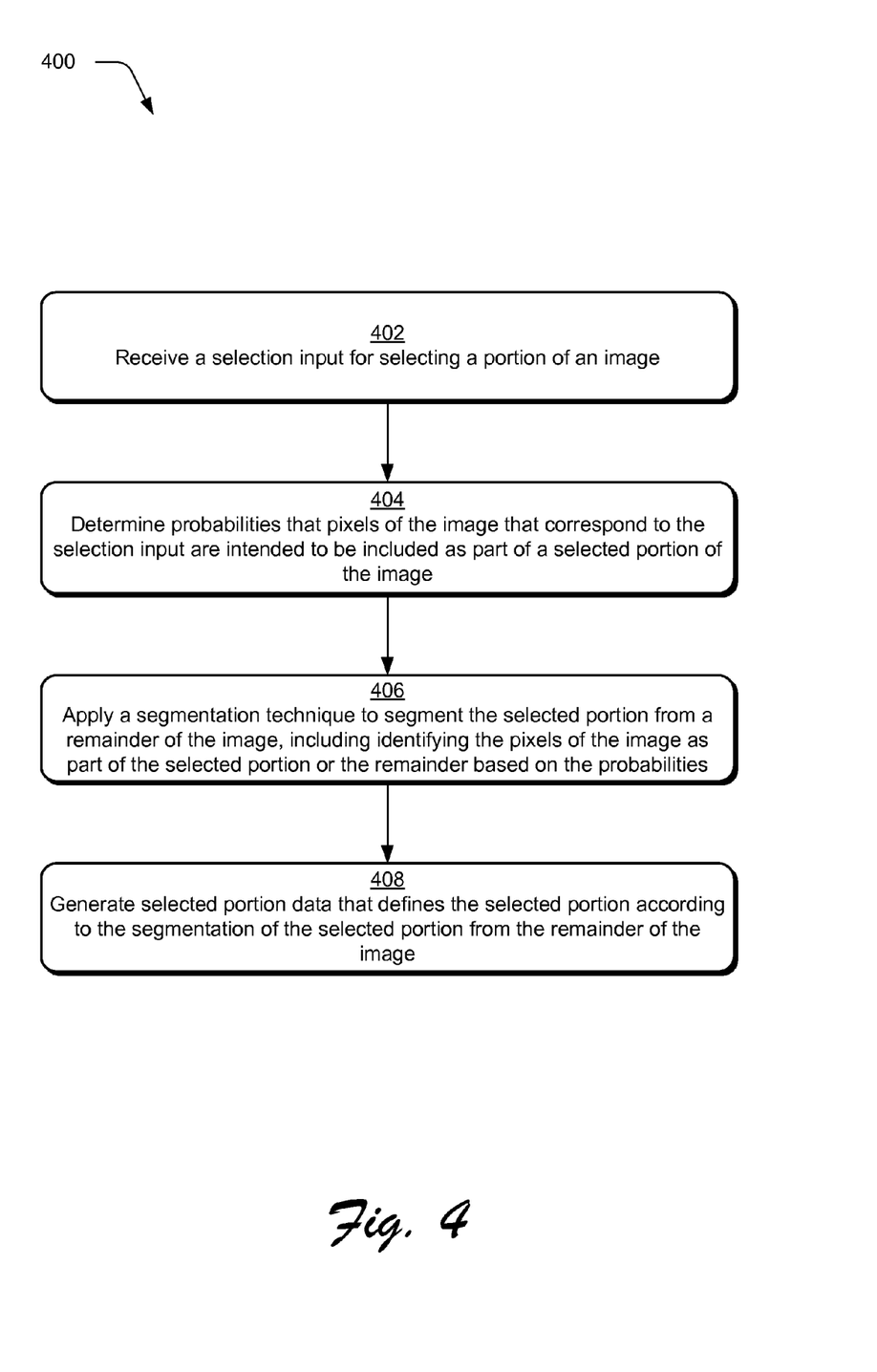
FIG. 4 is a flow diagram depicting a procedure in an example implementation in which a selected portion of an image is defined, in part, by determining probabilities that pixels corresponding to a selection input are intended to be included as part of the selected portion.

FIG. 4 depicts an example procedure 400 in which a selected portion of an image is defined, in part, by determining probabilities that pixels corresponding to a selection input are intended to be included as part of the selected portion. A selection input is received for selecting a portion of an image (block 402). For example, the selection input 204 is received at computing device 102 for selecting a portion of the image 202.

Probabilities that pixels of the image that correspond to the selection input are intended to be included as part of a selected portion of the image are determined (block 404). In particular, the probability for a given pixel is determined as a function of position relative to center pixels of the selection input and a difference in one or more visual characteristics with the center pixels. For example, the input determination module 110 employs the color model generation module 304 and the selection probability computation module 308 to compute probabilities that the pixels of the image 202 that correspond to the selection input 204 are intended to be included as part of a selected portion of the image, e.g., as part of the selected portion 210. The input determination module 110 causes the probabilities to be computed for the pixels that correspond to the selection input 204 as described in more detail above, for instance. In accordance with the probability calculation techniques described above, the selection probability computation module 308 computes the probability for a given pixel of the selection input 204 as a function of position relative to pixels along the center pathway 206 and a difference in one or more visual characteristics with such pixels.

A segmentation technique is applied to segment the selected portion from a remainder of the image, the application of which includes identifying the pixels of the image as part of the selected portion or the remainder of the image based in part on the probabilities (block 406). For example, the image segmentation module 312 takes the probabilities computed at block 404 as input to segment the selected portion 210 from the remainder of the image. To segment the selected portion 210 from the remainder of the image, the image segmentation module 312 may apply any of a variety of segmentation techniques to the image 202, such as the graph cuts technique, the maximum a posteriori Markov Random Fields (MAP-MRF) technique, the conditional random field (CRF) formulation technique, and so on Selected portion data is generated that defines the selected portion according to the segmentation of the selected portion from the remainder of the image (block 408). For example, the image segmentation module 312 generates the selected portion data 112 according to the segmentation performed at block 406. The selected portion data 112 is indicative of the selected portion 210 and enables image editing operations to be performed relative to the selected portion 210 without applying the image editing operations to the remainder of the image 202. The selected portion data 112 also enables image editing operations to be performed on the remainder of the image 202 without applying the image editing operations to the selected portion 210.

Figure 5:
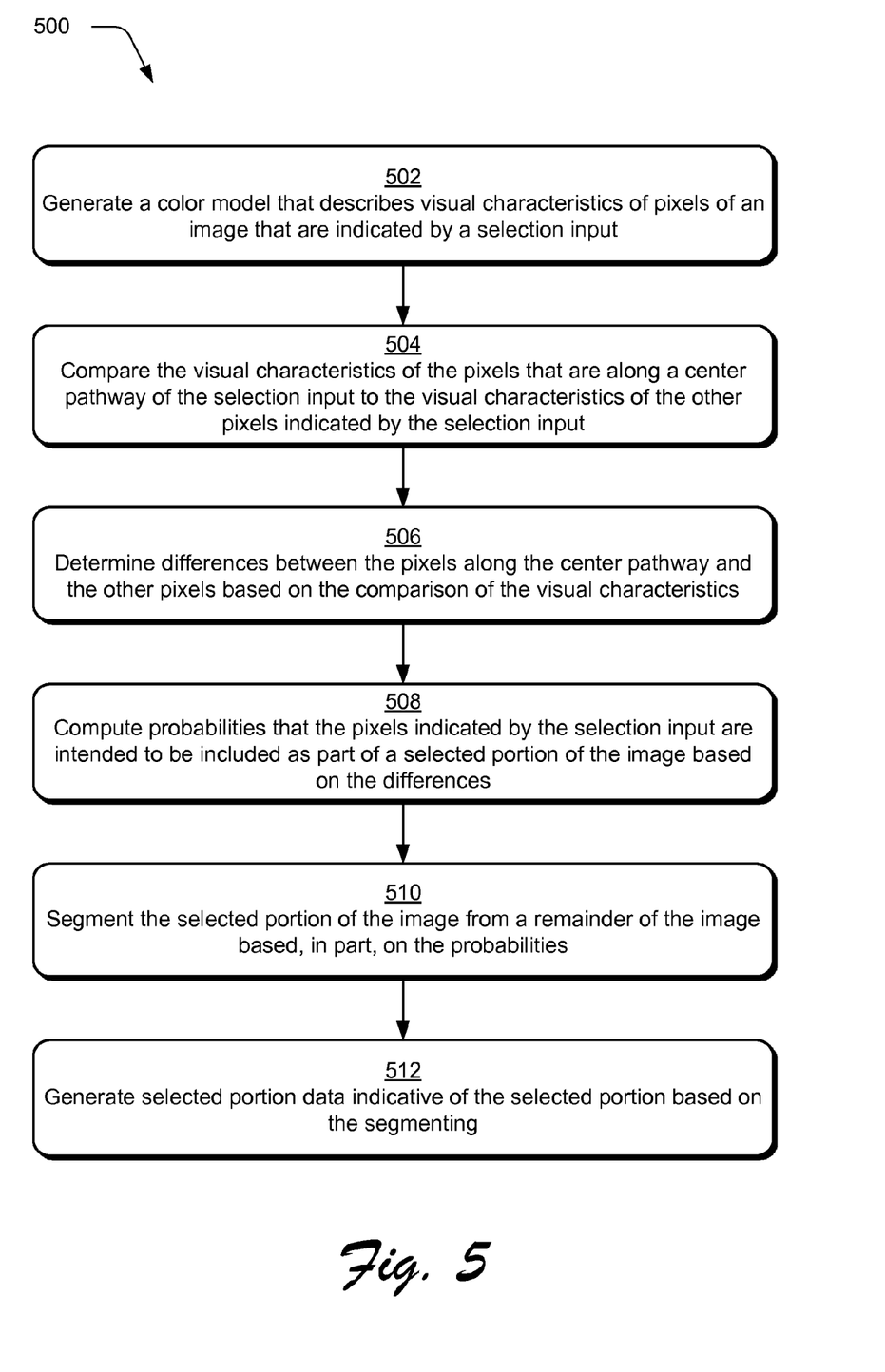
FIG. 5 is a flow diagram depicting a procedure in an example implementation in which probabilities are computed that pixels of an image that correspond to a selection input are intended to be included as part of a selected portion of the image.

FIG. 5 depicts an example procedure 500 in which probabilities are computed that pixels of an image that correspond to a selection input are intended to be included as part of a selected portion of the image.

A color model is generated that describes visual characteristics of pixels of an image that are indicated by a selection input (block 502). For example, the input determination module 110 employs the color model generation module 304 to generate the color model 306, which describes color characteristics of the pixels of the image 202. In one or more implementations, the color model 306 is an RGB color model that describes color characteristics of the pixels such as hue, saturation, and lightness. Although generation of a model that describes color characteristics is discussed throughout, other models describing other visual characteristics that enable differentiation between pixels can be used.

The visual characteristics of the pixels along a center pathway of the selection input are compared to the visual characteristics of the other pixels indicated by the selection input (block 504). For example, the input determination module 110 employs the selection probability computation module 308 to determine visual characteristics of the pixels along the center pathway 206, such as a color of the pixels along the center pathway 206. When the color model 306 corresponds to an RGB model, the visual characteristics determined for the pixels along the center pathway 206 correspond to RGB values of those pixels. The selection probability computation module 308 also determines visual characteristics of the other pixels indicated by the selection input 204, e.g., each of the pixels over which a stroke is performed for selecting a portion of the image 202. When the color model 306 corresponds to an RGB model, the visual characteristics determined for the other pixels indicated by the selection input 204 correspond to RGB values of those pixels. The selection probability computation module 308 then compares the visual characteristics of the pixels along the center pathway 206 to the visual characteristics of the other pixels of the selection input 204. When RGB values are determined for the pixels along the center pathway 206 and the other pixels of the selection input 204, the selection probability computation module 308 compares their RGB values.

Differences in the visual characteristics are determined between the pixels along the center pathway and the other pixels based on the comparison of the visual characteristics (block 506). For example, the selection probability computation module 308 determines a difference between the pixels along the center pathway 206 and the other pixels of the selection input 204 based on the comparison performed at block 504. When RGB values are compared for the pixels along the center pathway 206 and the other pixels of the selection input 204, the selection probability computation module 308 determines a difference in RGB values between those pixels.

Probabilities that the pixels indicated by the selection input are intended to be included as part of a selected portion of the image are computed based on the differences (block 508). For example, the selection probability computation module 308 computes probabilities that the pixels of the selection input 204 are intended to be included as part of the selected portion 210 of the image 202. The selection probability computation module 308 computes these probabilities based on the differences determined at block 506. In addition, the selection probability computation module 308 computes these probabilities as a function of distance between the pixels along the center pathway 206 and the pixels of the selection input 204.

Based in part on the probabilities, the selected portion of the image is segmented from a remainder of the image (block 510). For example, the image segmentation module 312 segments the selected portion 210 of the image 202 from a remainder of the image 202 using one or more of the segmentation techniques discussed above. The image segmentation module 312 is configured to use the probabilities computed at block 508 as input to a chosen segmentation technique, for instance.

Based on the segmentation, selected portion data is generated that is indicative of the selected portion of the image (block 512). For example, the image segmentation module 312 generates the selected portion data 112 to be indicative of the selected portion 210. The selected portion data 112 can indicate which pixels of the image 202 correspond to the selected portion 210 and which pixels of the image correspond to the remainder of the image. As discussed above, the selected portion data 112 can enable image editing operations to be applied solely to the selected portion 210, or solely to the remainder of the image 202.

Having described example procedures in accordance with one or more implementations, consider now an example system and device that can be utilized to implement the various techniques described herein.

Example System and Device

Figure 6:
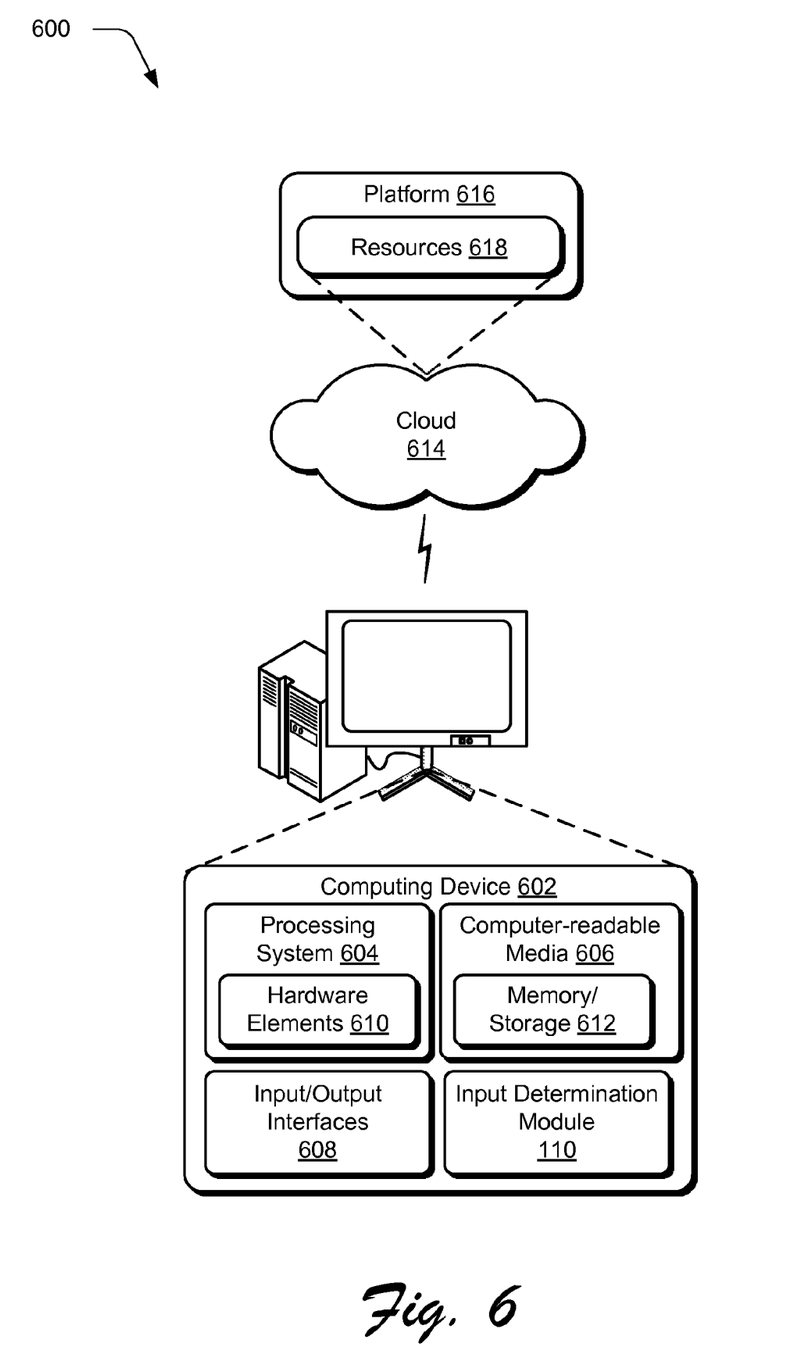
FIG. 6 illustrates an example system including various components of an example device that can be employed for one or more implementations of techniques for probabilistic determination of selected image portions that are described herein.

FIG. 6 illustrates an example system generally at 600 that includes an example computing device 602 that is representative of one or more computing systems and/or devices that implement the various techniques described herein. This is illustrated through inclusion of the input determination module 110, which operates as described above. The computing device 602 may be, for example, a server of a service provider, a device associated with a client (e.g., a client device), an on-chip system, and/or any other suitable computing device or computing system.

The example computing device 602 includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This includes implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 602, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that is employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules are implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software are achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 abstracts resources and functions to connect the computing device 602 with other computing devices. The platform 616 also serves to abstract scaling of resources to provide a corresponding level of scale to encountered demand for the resources 618 that are implemented via the platform 616. Accordingly, in an interconnected device implementation, implementation of functionality described herein is distributed throughout the system 600. For example, the functionality is implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device to define a portion of an image as selected based on selection input, the method comprising:

receiving a selection input for selecting a portion of an image displayed via a display device associated with the computing device, the selection input received using at least one of touch functionality of the display device or an input device communicably coupled to the computing device;

determining, from pixels of the image that correspond to the selection input, at least one center pixel of the selection input;

determining probabilities that the pixels corresponding to the selection input are intended to be included as part of a selected portion of the image, the probability for a selection-input pixel determined as a function of position relative to the at least one center pixel of the selection input and a difference in a visual characteristic with the at least one center pixel;

applying a segmentation technique to the image to segment the selected portion from a remainder of the image, the segmentation technique identifying the pixels of the image as part of the selected portion or as part of the remainder of the image based, in part, on the probabilities; and generating selected portion data that defines the selected portion according to the segmentation of the selected portion from the remainder of the image.

2. A method as described in claim 1, wherein the selection input is received using the touch functionality of the display device, the pixels of the image that correspond to the selection input being the pixels displayed where the display device is touched.

3. A method as described in claim 1, wherein the selection input corresponds to one or more strokes made by a finger of a user touching the display device.

4. A method as described in claim 1, wherein the selection input corresponds to one or more strokes made by a stylus touching the display device.

5. A method as described in claim 1, wherein the selection input is received via a mouse.

6. A method as described in claim 1, wherein determining the probabilities that the pixels corresponding to the selection input are intended to be included as part of the selected portion includes:
  determining the sat least one center pixel of the selection input for one or more strokes of the selection input;
  ascertaining a difference in color between the at least one center pixel of the selection input and the other selection-input pixels; and
  computing the probabilities using the difference in color as the difference in the visual characteristic.

7. A method as described in claim 6, wherein the probability that a selection-input pixel is intended to be included as part of the selected portion is less for a greater difference in color.

8. A method as described in claim 1, wherein the probabilities are used as input to the segmentation technique.

9. A method as described in claim 1, wherein the segmentation technique is one of a graph cuts technique, a maximum a posteriori Markov Random Fields (MAP-MRF) technique, or a conditional random field (CRF) formulation technique.

10. A method as described in claim 1, wherein the selected portion data enables a graphical effect to be applied via an image editing application to the selected portion of the image.

11. A method as described in claim 1, wherein the selected portion data enables a graphical effect to be applied via an image editing application to the selected portion of the image without application of the graphical effect to the remainder of the image.

12. A computing device comprising:
  a display device configured with touch functionality to detect selection inputs for selecting a portion of an image displayed on the display device;
  one or more processors; and
  computer readable storage media having stored thereon instruction that are executable by the one or more processors to implement a selection tool of an image editing application to perform operations for defining a portion of an image as selected, the operations comprising:
    detecting a selection input using the touch functionality of the display device, the selection input detected as one or more strokes made by a finger on the display device;
    determining at least one center pixel of the selection input from pixels of the image that correspond to the one or more strokes;
    computing probabilities that the pixels corresponding to the selection input are intended to be included as part of a selected portion of the image, the probability for a selection-input pixel computed based on a difference with the at least one center pixel of the selection input; and
    generating selected portion data to define the selected portion of the image by applying a segmentation technique to the image that takes the probabilities as input and segments the selected portion from a remainder of the image.

13. A computing device as described in claim 12, wherein the pixels that correspond to the selection input are located where the one or more strokes made by the finger are detected on the display device.

14. A computing device as described in claim 12, wherein the operations further comprise:
  defining a color model that describes color characteristics of the pixels corresponding to the selection input, including the at least one center pixel;
  sampling, from the color model, the color characteristics of the pixels corresponding to the selection input, including the at least one center pixel; and
  comparing the sampled color characteristics of the pixels corresponding to the selection input to the sampled color characteristics of the at least one center pixel to determine the difference.

15. A computing device as described in claim 12, further comprising a housing having a form factor of a tablet.

16. A computing device as described in claim 12, further comprising a housing having a form factor of a mobile phone.

17. A method implemented by a computing device to define a portion of an image as selected based on selection input, the method comprising:
  generating a color model that describes a visual characteristic of pixels of an image that are indicated by a selection input, the selection input received using at least one of touch functionality of a display device associated with the computing device or an input device communicably coupled to the computing device;
  determining, from the pixels indicated by the selection input, at least one center pixel of the selection input;
  comparing the visual characteristics of the at least one center pixel of the selection input to the visual characteristics of other pixels indicated by the selection input;
  determining differences between the at least one center pixel and the other pixels based on the comparing;
  computing probabilities that the pixels indicated by the selection input are intended to be included as part of a selected portion of the image based on the differences;
  segmenting the selected portion of the image from a remainder of the image based, in part, on the probabilities; and
  generating selected portion data indicative of the selected portion based on the segmenting, the selected portion data enabling an indication of the selected portion to be displayed via a display device.

18. A method as described in claim 17, wherein the selected portion data enables the selected portion of the image to be modified without modifying the remainder of the image.

19. A method as described in claim 17, wherein the selected portion data enables the remainder of the image to be modified without modifying the selected portion of the image.

20. A method as described in claim 17, wherein the image comprises a first image file and the selected portion data comprises a second image file that is separate from the first image file.

* * * * *

UNITED STATES PATENT AND TRADEMARK OFFICE
CERTIFICATE OF CORRECTION

PATENT NO. : 10,055,107 B2
APPLICATION NO. : 14/853069
DATED : August 21, 2018
INVENTOR(S) : Brian L. Price and Ian D. Sachs Page 1 of 1

It is certified that error appears in the above-identified patent and that said Letters Patent is hereby corrected as shown below:

In the Claims

Column 17, Line 28, Claim 6 after "determining the", delete "sat", insert -- at -- therefor.

Signed and Sealed this
Thirtieth Day of October, 2018

Andrei Iancu
*Director of the United States Patent and Trademark Office*